United States Patent [19]
Johnson et al.

[11] Patent Number: 5,454,687
[45] Date of Patent: Oct. 3, 1995

[54] HIGH SPEED SORTER/STACKER

[76] Inventors: Peter E. Johnson, 5000 Crescent Valley Dr.; David A. Johnson, 2120 NW. Maser Dr., both of Corvallis, Oreg. 97330

[21] Appl. No.: 900,529

[22] Filed: Jun. 17, 1992

Related U.S. Application Data

[63] Continuation of Ser. No. 579,848, Sep. 6, 1990, abandoned.

[51] Int. Cl.⁶ .................................................. B65G 57/06
[52] U.S. Cl. .................. 414/790.7; 198/817; 198/370.1; 414/790.4; 414/791.1; 414/794.4
[58] Field of Search ........................ 198/372, 465.3, 198/456, 463.4, 418.3, 418.6, 484.1, 803.13, 817; 414/788.2, 788.8, 790.4, 790.7, 793.4, 794.3, 793.5, 789.6, 791.1, 790.6, 794.4

[56] References Cited

U.S. PATENT DOCUMENTS

| | | | |
|---|---|---|---|
| 2,822,932 | 2/1958 | Patrick | 414/790.7 |
| 2,870,921 | 1/1959 | Winkel | 414/793.5 X |
| 3,101,836 | 8/1963 | Rountree | 198/415 X |
| 3,675,792 | 7/1972 | Griner et al. | 414/798.5 X |
| 4,137,604 | 2/1979 | Sandberg | 414/790.7 X |
| 4,236,855 | 12/1980 | Wagner | 414/790.8 X |
| 4,285,621 | 8/1981 | Spencer | 414/790.4 X |
| 4,623,291 | 11/1986 | Buck | 414/794.3 X |
| 4,645,400 | 2/1987 | Mally et al. | 414/788 |
| 4,823,940 | 4/1989 | Cretser | 198/817 |
| 4,824,307 | 4/1989 | Johnson et al. | 414/798.2 |
| 4,850,472 | 7/1989 | Liebel et al. | 198/465.3 X |
| 4,852,718 | 8/1989 | Kunstmann | 198/465.3 |
| 4,973,218 | 11/1990 | Wirtz et al. | 414/791.1 |
| 5,006,040 | 4/1991 | Frey | 414/790.7 X |

FOREIGN PATENT DOCUMENTS

| | | | |
|---|---|---|---|
| 127224 | 5/1990 | Japan | 198/418.6 |
| 473043 | 7/1969 | Switzerland | 414/789.6 |
| 1240456 | 7/1971 | United Kingdom | 414/789.6 |

*Primary Examiner*—Michael S. Huppert
*Assistant Examiner*—Janice L. Krizek
*Attorney, Agent, or Firm*—Chernoff, Vilhauer, et al.

[57] ABSTRACT

An apparatus for sorting and stacking thin rigid plates, such as used in storage batteries, receives the plates horizontally in spaced-apart groups, transports the groups horizontally and deposits them into stacks on a stacking apparatus that orients them vertically and delivers them for further processing. The groups of plates are carried on a conveyor system having chains that are spaced further apart than the width of the plates. Opposed pads extending inwardly from the chains engage the edges of the plates. Each pad has a length approximately equal to the height of the plates and is separated from each adjacent pad by a distance that is greater than the height of the plates. Stops located between the chains contact the groups of plates and prevent their continued movement with the chains thus causing them to drop between adjacent pads and off of the conveyor. In a preferred embodiment the apparatus includes a collection system that causes every group of plates in a stack to drop the same distance. Also, in a preferred embodiment, at least some groups of plates in each stack are displaced onto a transfer conveyor, that operates at a lower speed than the main conveyor, before they reach the stacking apparatus. Thus, there is more time between the arrival of groups of plates at the stacking apparatus, which permits the just formed stack to be advanced without interference from the first group of the next stack.

8 Claims, 6 Drawing Sheets

HIGH SPEED SORTER/STACKER

This application is a continuation of application Ser. No. 07/579,848, filed Sep. 6, 1990, now abandoned.

BACKGROUND AND SUMMARY OF THE INVENTION

This invention relates to an apparatus for placing horizontally oriented plates into stacks at a high rate of speed and in a delicate manner.

In the production of storage batteries horizontally oriented plates leave an enveloping apparatus serially or in small groups, and these groups must be placed into stacks and the stacks oriented vertically for further processing. A prior art apparatus for accomplishing this objective is shown in Johnson et al., U.S. Pat. No. 4,824,307. Johnson et al. utilizes a series of paddles on a conveyor that comprises a pair of endless chains. The paddles are arranged in pairs that define pockets which carry the stacks. The stacks are formed when a pair of paddles is placed at the end of the conveyor so that the pocket is open and the plates can be dropped into it off the end of a conveyor that carries them horizontally. When a stack is formed the chains are advanced to orient the newly-formed stack vertically and position the next pair of paddles in the proper position to receive plates. This apparatus has several shortcomings which limits its ability to handle delicate plates and to stack plates at high speeds.

As the plates are dropped off of the end of the conveyor they rotate to near the desired vertical orientation and this rotation requires a long drop which creates an impact upon landing that can damage delicate plates. In addition, the long drop causes the plates to float which results in their being misaligned when the stacks are formed. Thus, the device disclosed in Johnson et al. has an alignment apparatus which adds to its overall expense.

In addition, after each stack is formed the paddles advance, with the newly-formed stack being rotated to a completely vertical orientation and the next set of paddles is placed at the end of the conveyor to form an opened pocket. This advancement must be accomplished while the area above the paddles is free of plates. Since the advancement takes some time to accomplish there is a limit to how fast the plates can be fed to the stacking apparatus on the conveyor and still not have interference.

The subject invention overcomes the foregoing shortcomings and limitations of the prior art by providing a conveyor system for transporting horizontally oriented thin rigid plates, in groups of one or more plates, in a manner such that the groups can be displaced from the conveyor system by placing a stop in front of them so as to prevent their continued movement when the conveyor system continues to operate. Thus, the plates displaced from the conveyor drop into stacks while they remain horizontal, thereby permitting the drop distance to be minimized.

In a preferred embodiment of the invention this is accomplished by making the space between the chains in the conveyor system greater than the width of the plates and placing inwardly extending support pads on the chains that engage the side margins of the plates. The support pads are placed in spaced-apart sets with each set having a length approximately equal to the height of the plates, and each set being separated from its adjacent set by a distance that is sufficient to allow the plates to pass between them.

In one embodiment, the stop is the paddles of the device disclosed in Johnson et al. In another embodiment the stop is located on the piston of a piston cylinder that is arranged so that the stop engages the group of plates when the piston cylinder is extended and does not engage the group when the piston cylinder is retracted.

The invention also includes a sorting apparatus that permits selected groups of plates to be removed from the conveyor system before the groups are displaced to form the stack. Thus, reject plates can be removed while the plates are being processed.

The invention also includes provisions for varying the distance between the conveyor system and the device that collects the displaced plates. As a result, the collection device can be lowered by a distance equal to the thickness of a group of plates each time a group is displaced so that every group drops the same distance.

Finally, the invention provides a transfer conveyor that operates at a lower speed than the conveyor system and receives some or all of the groups of plates and delivers them to the stacking apparatus. This causes the groups of plates to arrive at the stacking apparatus at a slower speed than they would if they came directly from the conveyor system. Therefore, there is more time for the completed stacks to be moved out of the way and not interfere with the arriving groups of plates of the next stack, and the apparatus can be operated at a higher rate of speed.

Accordingly, it is a principal object of the subject invention to provide a plate stacking apparatus in which plates transported in spaced-apart, horizontally oriented groups on a conveyor are slid off the conveyor and collected in stacks while remaining horizontal, thereby only requiring the plates to drop a short distance.

It is a further object of the present invention to provide such a device in which the chains of the conveyor that carry the plates are spaced apart by a distance that would permit the plates to drop between them and has inwardly projecting supports that engage the edges of the plates.

It is a further object of the subject invention to provide such a device in which each group of plates in a stack drops the same distance as every other group.

It is a still further object of the subject invention to provide such a device in which the plates are presented to the stacking apparatus which orients them vertically at a speed that is slower than the speed at which they are transported on the conveyor.

It is a still further object of the subject invention to provide such a device which permits defective groups of plates to be removed from the conveyor before they reach the stack so that a full size defect-free stack is always formed.

The foregoing and other objectives, features and advantages of the present invention will be more readily understood upon consideration of the following detailed description of the invention taken in conjunction with the accompanying drawings.

PREFERRED EMBODIMENT OF THE INVENTION

Figure 1:
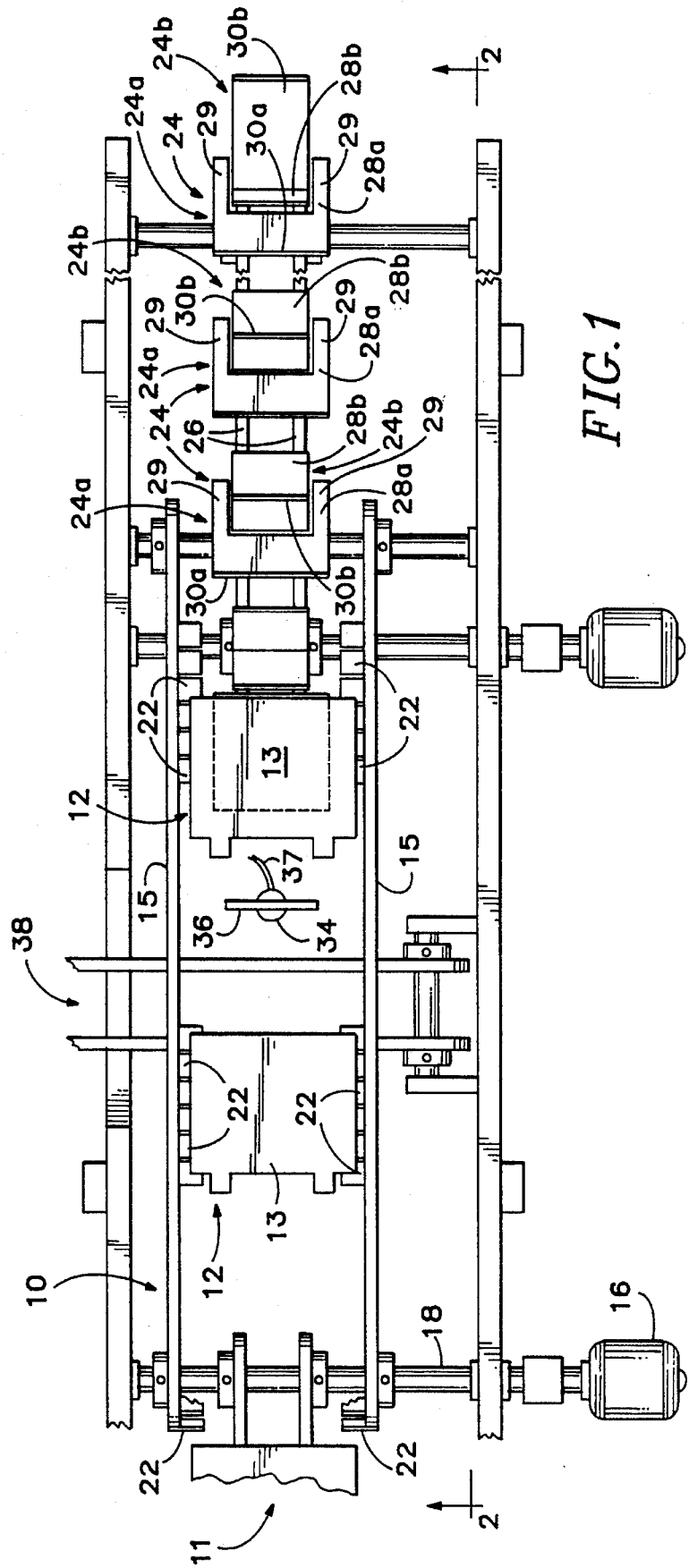
FIG. 1 is a foreshortened plan view showing a sorter/stacker embodying the features of the subject invention.
Figure 2:
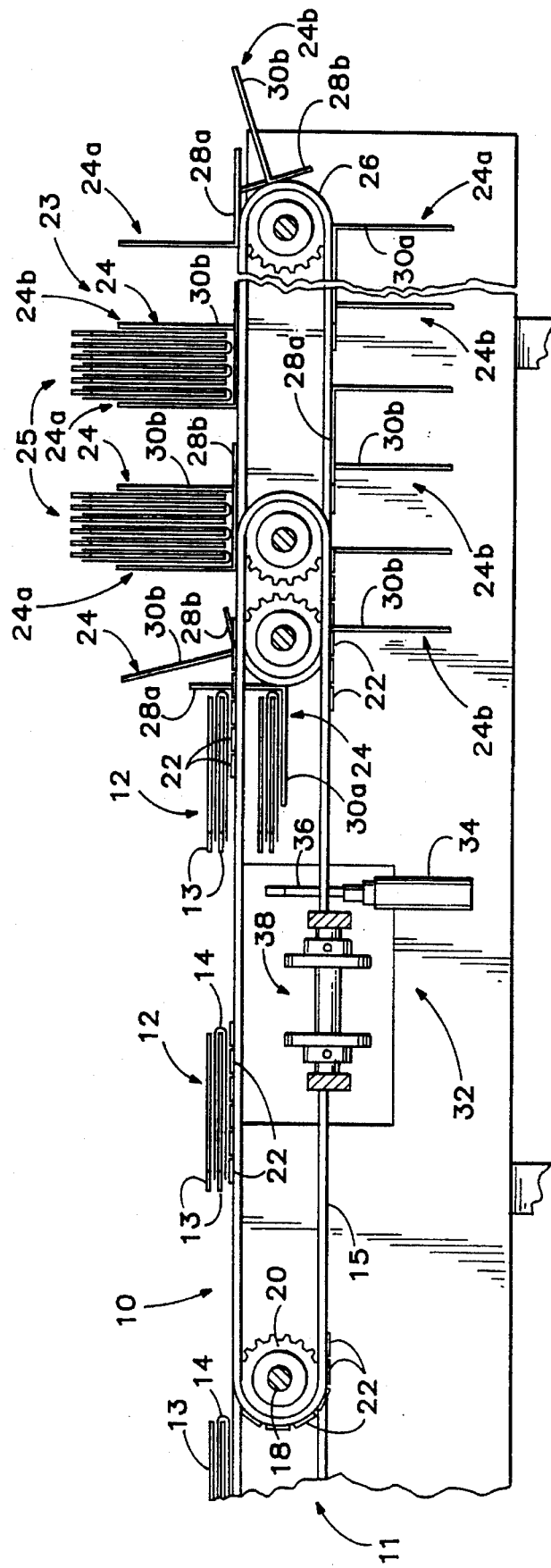
FIG. 2 is a sectional view taken along the lines 2—2 of FIG. 1.

Referring now to FIGS. 1 and 2 of the drawings, a preferred embodiment of the subject invention in its simplest form comprises a conveyor system 10 which transports groups of plates 12, of the type used in lead-acid storage batteries, in a horizontal orientation. Each group comprises a bare plate 13 that is stacked on top of a plate 13 that is encapsulated in a case 14 made from a microporous polyethylene material. Stacks containing multiple groups of plates are connected together to form a cell of a battery. The plates are arranged in the horizontal groups and placed on the conveyor system 10 by an enveloping apparatus 11, such as disclosed in Johnson, U.S. Pat. No. 4,407,063. The apparatus can be used to stack other types of plates as well. Because it handles the plates gently even at high speed, it is particularly well-suited for stacking the more delicate glass wool encapsulated plates used in recombination batteries.

The conveying system 10 illustrated comprises a pair of parallel, side-by-side endless chains 15 that are driven by a motor 16 through a shaft 18 and sprocket drive 20. The chains 15 are separated by a distance that is slightly greater than the width of the largest plate that will be transported on them. Opposed sets of support pads 22 extend inwardly from the chains at spaced-apart intervals. The support pads extend inwardly from the chains a sufficient distance to engage the margins of the plates and thus prevent them from dropping between the chains as they otherwise would. Each set of support pads extends along the chains a distance that is approximately equal to the length of the plates and is separated from the adjacent set of support pads by a distance that will allow the plates to pass between them. Thus, if movement of the plates is prevented and the chain continues to travel, the plates will be displaced from the conveyor system.

In this embodiment the conveyor system discharges the plates directly to a stacking apparatus 23, such as disclosed in Johnson, U.S. Pat. No. 4,824,307, which forms a stack 25 of the plates and then rotates the stack to a vertical orientation and transmits it to a work station where a strap is cast onto the plates to provide the battery cell. The stacking apparatus prevents movement of the plates along with the chains and causes them to be displaced from the conveyor system. The stacking apparatus has a plurality of paddles 24 that are carried on a conveyor comprising a pair of endless chains 26. The paddles are arranged in pairs that receive and support a stack of plates. Each pair comprises a first paddle 24a that is L-shaped and has a base leg 28a which is parallel with the chains and an upright leg 30a which is perpendicular with the chains. The extremity of the base leg 28a is split into two fingers 29 that are separated from one another. A second paddle 24b is T-shaped with its upright leg 30b being attached centrally to its base leg 28b. The second paddles are narrower than the first paddles and fit partially between the fingers 29. The chains 26 and the paddles are narrower than the chains 15 and the two overlap somewhat. The stacking apparatus has a timing device that interrupts the movement of the chains 26 when the upright leg 30a of each second paddle is at the end of the conveyor and thus is horizontal. The base 28a of the paddle 24a positioned at the end of the chains 26 acts as a stop which contacts the groups of plates traveling on the conveyor system. The groups of plates are then slid off of the supports 22 and drop onto the upright leg 30a of the paddle. When the appropriate number of groups of plates has been assembled on the paddle to form a stack 25, the chains 26 are advanced until the stack is sandwiched between the upright legs 30a and 30b of the pair of paddles in a vertical orientation and the rearward paddle of the next pair of paddles is oriented with its upright leg horizontal.

Since the groups of plates are traveling on the conveyor system 10 in a horizontal orientation and drop down to the upright leg 30 of the paddle, the greatest distance any group drops is equal to the thickness of the stack 25 and the impact upon landing is slight. In addition, since the conveyor system is moving at a high rate of speed and the groups of plates travel a short distance, they remain essentially horizontal as they drop.

Located on the apparatus below the conveyor system 10 is a sorting apparatus 32 that can be used to remove defective groups of plates from the conveyor system before they reach the paddles 24. The sorting apparatus includes a piston cylinder 34 situated below the conveyor system. Mounted on the piston cylinder is a stop 36 which is below the path of the stacks of plates being transported on the conveyor system when the piston cylinder is retracted and contacts the groups of plates when the piston cylinder is extended. Thus when the piston cylinder is extended the stop 36 displaces the groups of plates from the conveyor system. The piston cylinder is operated by an appropriate controller (not shown) through supply lines 37. Located beside the piston cylinder 34 is a conveyor 38 that is oriented normal to the conveyor system 10 in a manner to receive the groups of plates that are removed from the conveyor system by the stop 36. The conveyor 38 then transports the rejected groups of plates to a bin (not shown).

Figure 3:
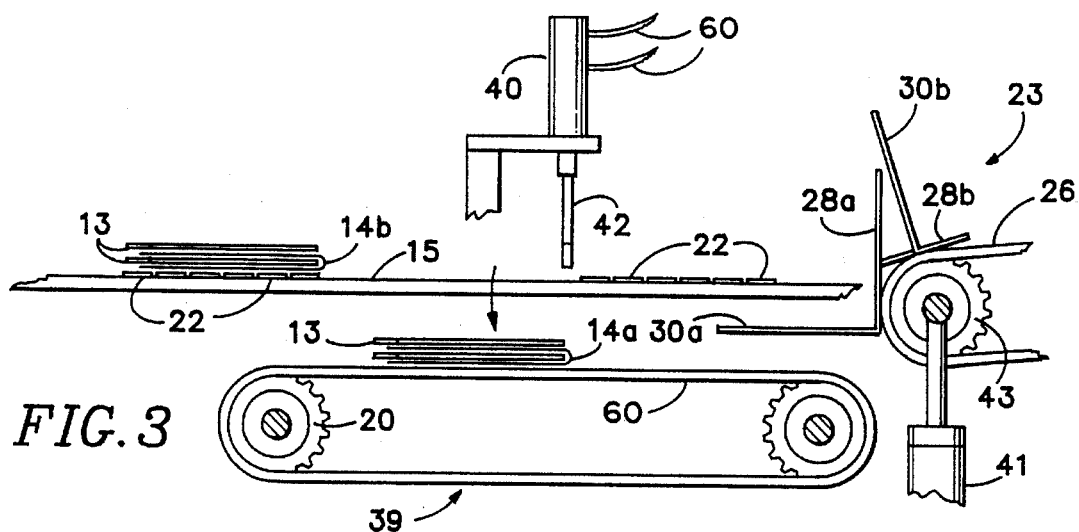
FIGS. 3–5 are schematic views showing the operation of a sorter/stacker embodying another feature of the invention.
Figure 4:
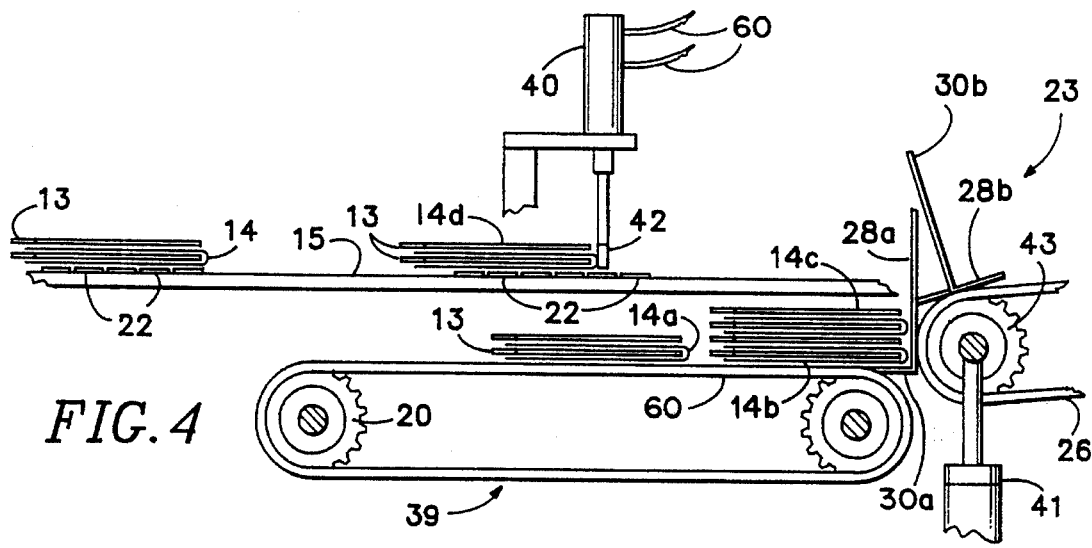
Figure 5:
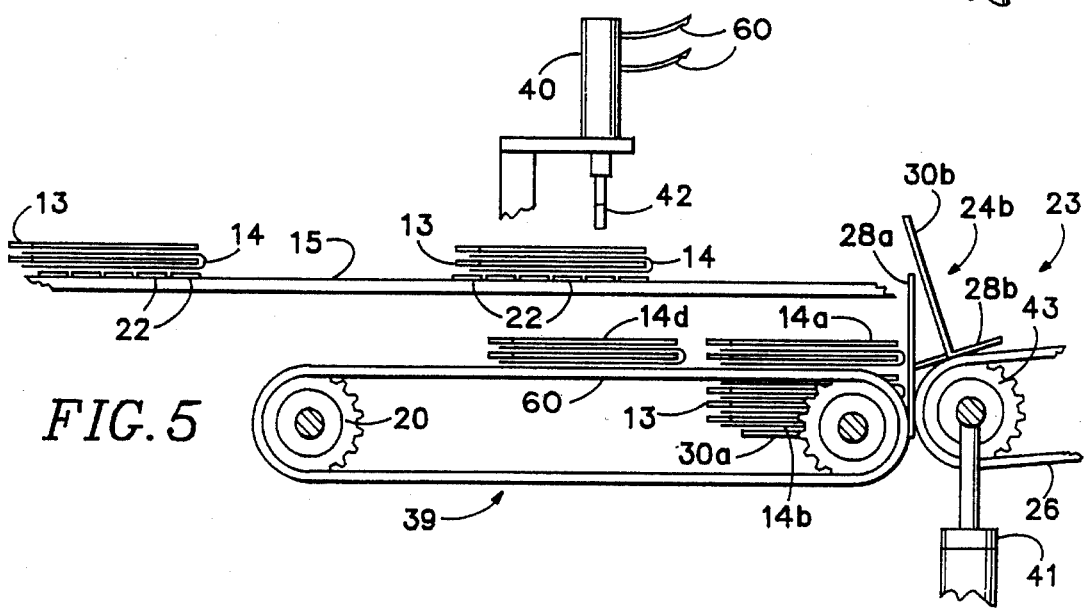
Figure 6:
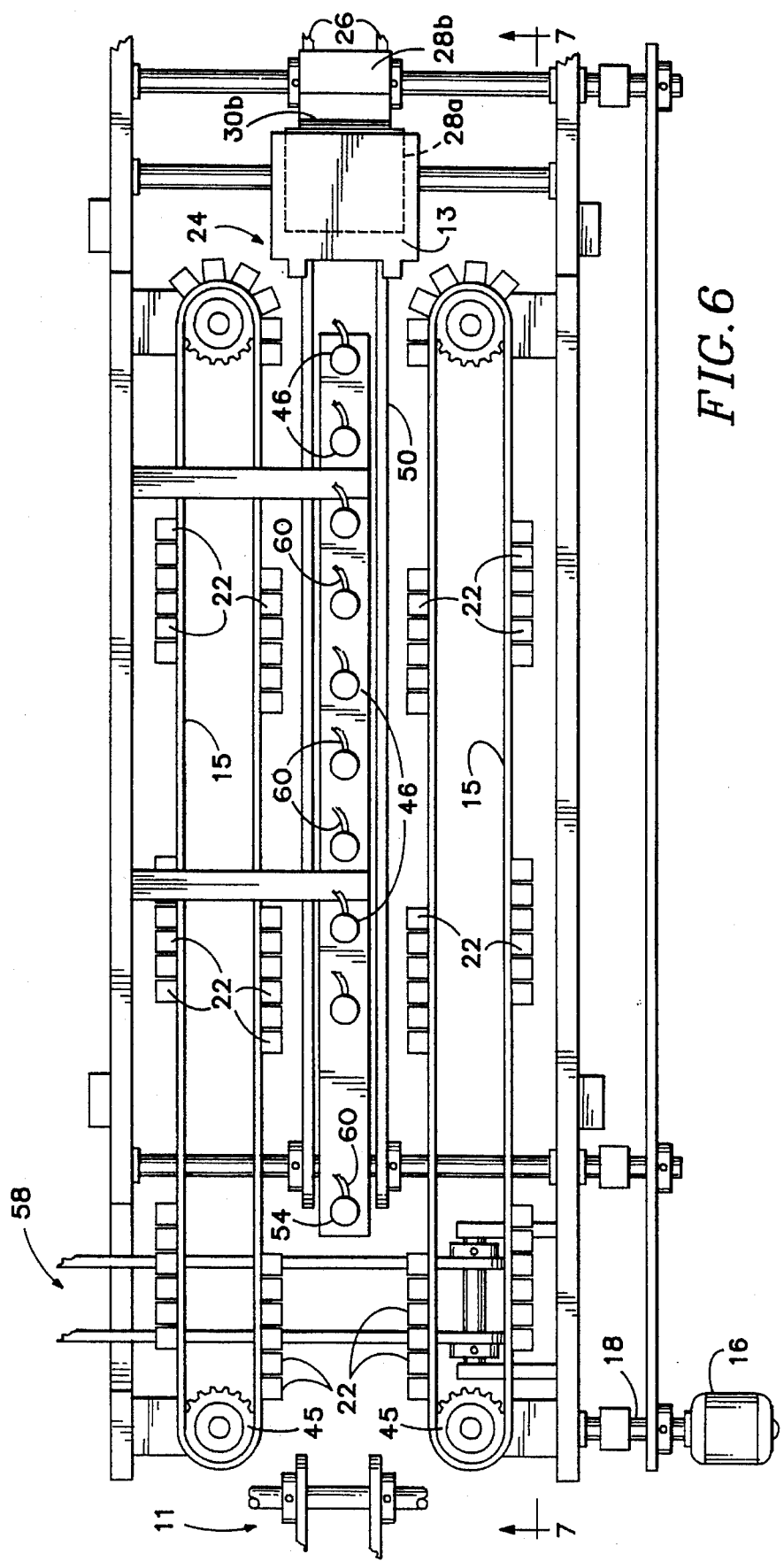
FIG. 6 is a plan view of another embodiment of the invention.
Figure 7:
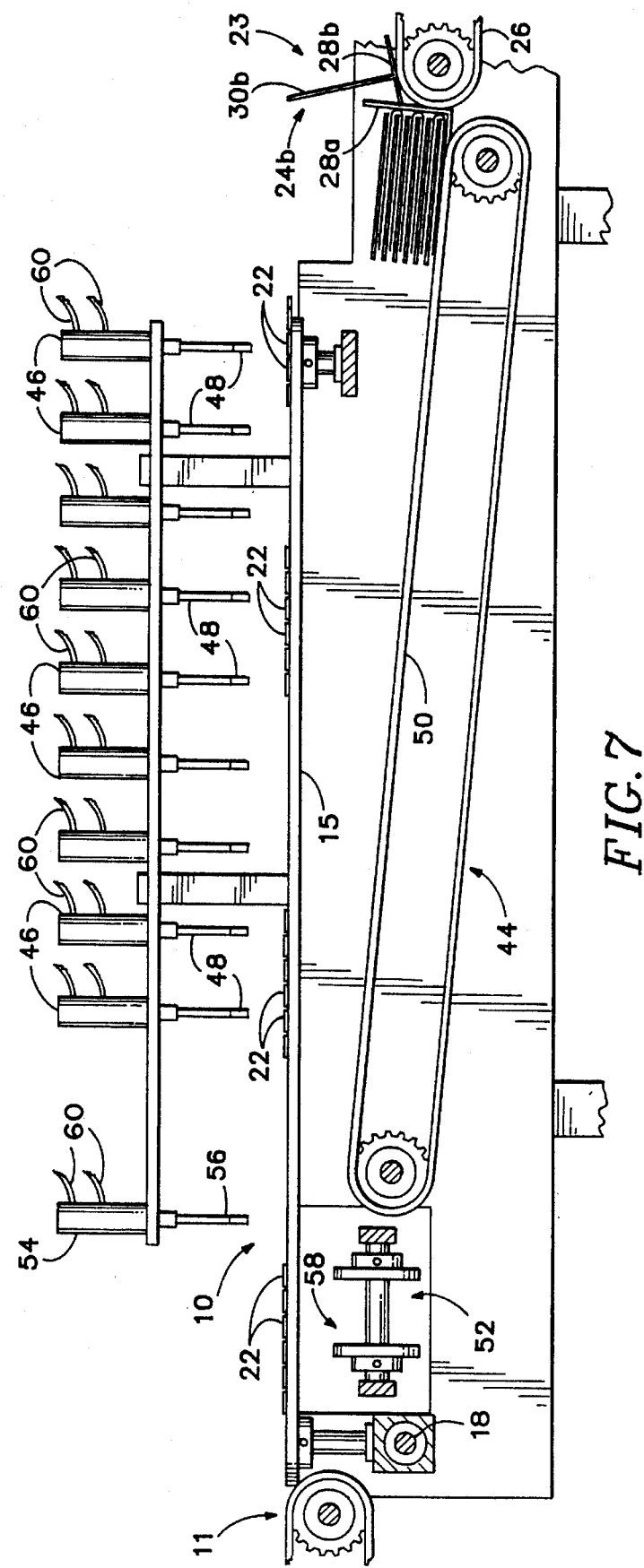
FIG. 7 is a sectional view taken along the lines 7—7 of FIG. 6.
Figure 8:
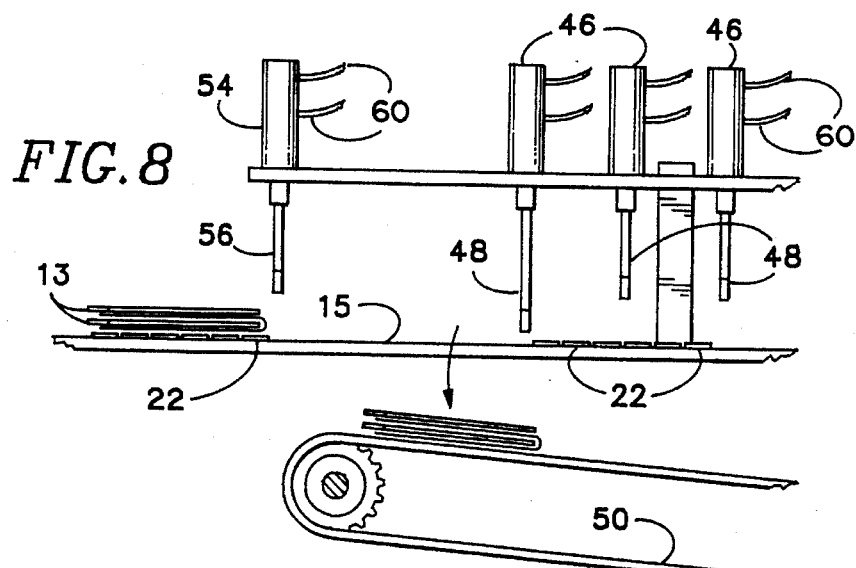
FIGS. 8–10 are schematic views showing the operation of the embodiment shown in FIGS. 6 and 7.
Figure 9:
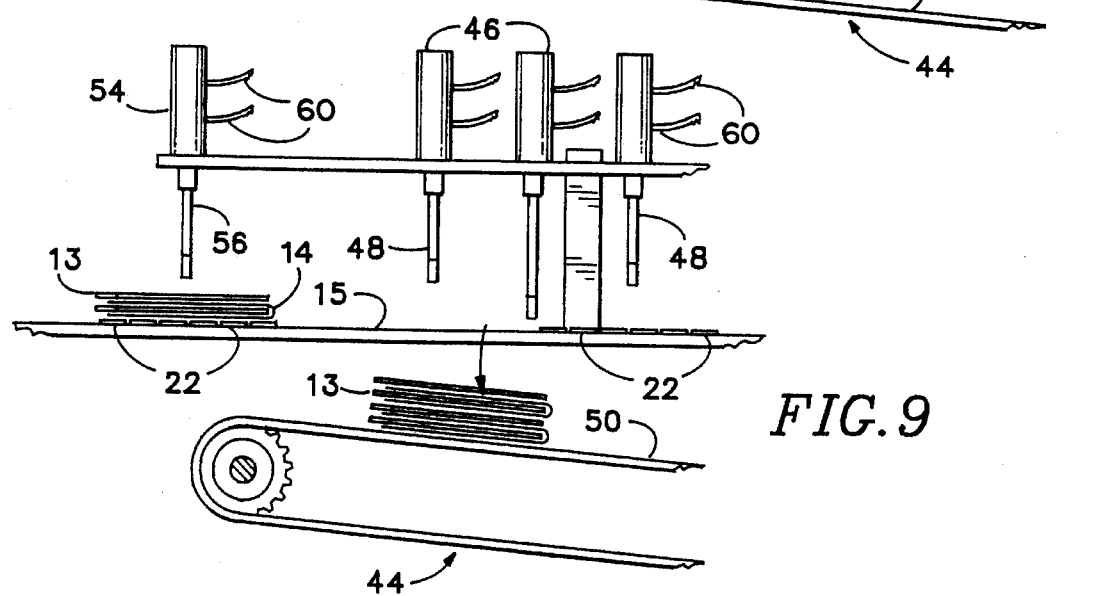
Figure 10:
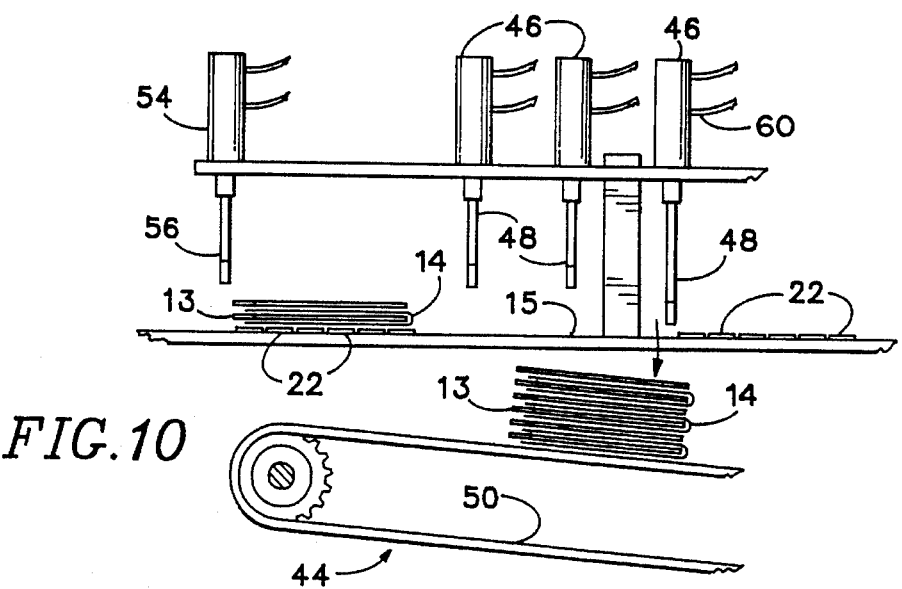

Referring now to FIGS. 3–5, an alternate embodiment includes additional features of the subject invention that makes the plate drop even more gently and permits the apparatus to operate at a higher speed. This is accomplished by providing a transfer conveyor 39 below the conveyor system that operates at a lower speed than the conveyor system 10. The transfer conveyor, in conjunction with the stacking apparatus 23, provides a collection system. The collection system causes each group of plates to drop approximately the same distance when it is displaced from the conveyor system. In addition, the collection system creates a pause between when the last group of plates in one stack and the first group of plates in the next stack arrive at the stacking apparatus.

In this embodiment the sprockets 43 that carry the chains 26 are mounted on a linear translation device 41 that permits the sprockets to be raised and lowered. Thus, the upstanding leg 30a of the first paddle 24a can be lowered by a distance equal to the thickness of one group of plates each time a group is added to the stack. As a result, each group drops the same distance. In addition, the first group of plates in each stack is displaced from the conveyor means before it reaches the paddle by a piston cylinder 40 and stop 42, that is similar to the piston cylinder 34 and stop 36. The groups of plates displaced by the stop 42 drop onto the transfer conveyor 39. The speed of the transfer conveyor is sufficiently slower than the speed of the conveyor system 10 so that the group of plates deposited on it reaches the paddle after the remaining groups in the stack have already been displaced onto the paddle, and the upright leg 30a is positioned below the chains 37 of the transfer conveyor 39. Thus, the group displaced onto the transfer conveyor is removed from it by the base leg 28a of the paddle in the same manner that the other groups are removed from the conveyor system.

The first group of plates 14a being carried on the conveyor system 10 for each new stack is displaced onto the transfer conveyor 39 by the piston cylinder 40 and stop 42, FIG. 3. This group of plates 14a will become the last group placed on the stack. The remaining groups, shown as 14b and 14c, will travel to the end of the conveyor system and be displaced directly onto the paddles, FIG. 4, the sprockets 43 being lowered by the linear translation device 41 between each group. As can be seen in FIG. 4, the first group of plates 14d associated with the next stack is also displaced from the conveyor system 10 onto the transfer conveyor at this stage of the process. The group of plates 14a that was displaced onto the transfer conveyor 37 then catch up with the stack which has dropped to the level where the group of plates 14a is immediately above the stack and is removed from the transfer conveyor by striking the base leg 28 of the paddle. Alternatively, the group of plates displaced onto the transfer carrier can be the first group in each stack. In this case, the transfer carrier will be at its lowest position when the first group is deposited on the paddle, will be raised to its highest position for the next group, and then progressively lowered for subsequent groups. This sequence is necessary when the stack has a bare plate at both ends rather than only at one end as shown in the embodiment illustrated. In either embodiment, there is more time to move the paddles and the apparatus can be operated at a higher rate of speed.

In a third embodiment of the invention, shown in FIGS. 6–10, all of the groups of plates are displaced from the high speed conveyor system 10 onto a slower speed transfer conveyor 44 and thence from the transfer conveyor to the paddles 24 of the stacking apparatus 23. In this embodiment the chains 15 of the conveyor system travel about sockets having vertical axes rather than horizontal axes. This provides more open space under the conveyor system for the transverse conveyor. In addition, by having vertical axes the chains 15 travel around the sprockets 45 at the end of the conveyor system at the point where the plates are transferred from the enveloping apparatus 11 to the conveyor system. Thus, the chains 15 center the groups of plates on the conveyor system. The vertical axes conveyor system can be used on any of the embodiments disclosed.

In this embodiment all of the groups of plates are displaced from the conveyor system by a plurality of overhead piston cylinders 46 and stops 48 that are positioned at spaced-apart intervals along the conveyor system. The piston cylinders 46 are operated by a controller (not shown) through supply lines 60. The first group of plates in a stack is displaced by the first piston cylinder/stop, FIG. 8, the second group of plates is displaced by the second piston cylinder/stop, FIG. 9, the third group of plates is displaced by the third piston cylinder/stop, FIG. 10, and subsequent plates are displaced by subsequent piston cylinder/stops. In the embodiment illustrated there are nine piston cylinder/stops, although more or less could be provided. If less groups of plates are called for, only the appropriate number of piston cylinders/stops will be used.

In order to have each group of plates drop the same distance as every other group, the chains 50 of the transfer conveyor 44 slope away from the chains 15 in the vertical direction extending in the direction of travel. The stacks of plates are removed from the transfer conveyor by the paddles 24 of the stacking apparatus 23 in the same manner as in the previously described embodiments.

Like the first embodiment, reject groups of plates are removed by a sorting apparatus 52 that is similar to the sorting apparatus 32. The piston cylinder 54 and stop 56 in the sorting apparatus 52 are located above the conveying system 10 rather than below, however, the conveyor 58 is identical to the conveyor 38.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An apparatus for stacking thin rigid plates comprising:
    (a) conveyer means for conveying thin rigid plates along a first conveying path in discrete, horizontally oriented, spaced-apart groups, said conveyor means moving said groups of plates in a first direction;
    (b) displacement means for displacing said groups of plates from said conveyor means at multiple selected points along said first conveying path in a manner such that they will drop while remaining substantially in said horizontal orientation, and arranging said groups into stacks with each stack containing a predetermined member of plates; and
    (c) transfer conveyor means, located below said conveyor means, which travels at a slower speed than said conveyor means along a second conveying path which is located directly beneath a substantial portion of said first conveying path for receiving said groups of plates as they are displaced from said conveyor means, wherein said transfer conveyor moves said groups of plates in a second direction, and at least a component of said second direction is said first direction.

2. The apparatus of claim 1 wherein:
    (a) said displacement means includes a plurality of stops located at selected positions along said conveyor means, and actuation means associated with said stops for placing said stops in extended positions where they will prevent said groups of plates from continuing to travel with said conveyor means, or retracted positions where said stops do not contact said groups of plates;
    (b) said second conveying path diverging downwardly with respect to said first conveying path; and
    (c) said actuation means being operable in a manner to cause successive groups of plates traveling on said conveyor means to be displaced by appropriate ones of said stops so that said groups of plates are stacked one on top of another on said transfer conveyor means until a complete stack is formed.

3. The apparatus of claim 1, further comprising:
    (a) support means, located on said conveyor means, for supporting the groups of plates being transported, said support means being positioned at spaced-apart intervals along said conveyor means;
    (b) said intervals being sufficient to allow said horizontally oriented plates to pass between adjacent support means; and
    (c) said displacement means including stops located at selected positions along said conveyor means, said stops being arranged to selectively contact plates being carried by said support means and prevent said plates from continuing to travel with said conveyor means.

4. The apparatus of claim 3 further comprising:
    (a) said displacement means including first displacement means that displaces selected groups of plates onto said transfer conveyor means and second displacement means that displaces the remainder of said groups of plates from said conveyor means;

(b) collection means for receiving groups of plates displaced from said conveyor means by said second displacement means in vertical stacks containing multiple groups;

(c) means for varying the distance between said collecting means and said conveyor means so that each group of plates displaced by said second displacement means drops approximately the same distance as every other group; and (d) said collection means being located relative to said transfer conveyor means so that said selected groups of plates are displaced from said transfer conveyor means onto said collection means.

5. The apparatus of claim 3 wherein said conveyor means comprises a pair of spaced-apart chains that are separated from one another by a distance which is greater than the width of the largest plate that will be transported thereon.

6. The apparatus of claim 5 wherein said support means comprises opposed pads which extend inwardly from each of said chains and contact the margins of said plates.

7. The apparatus of claim 5 wherein said chains are carried on sprockets that rotate about vertical axes.

8. The apparatus of claim 5 wherein said chains are carried on sprockets that rotate about horizontal axes.

* * * * *

UNITED STATES PATENT AND TRADEMARK OFFICE
CERTIFICATE OF CORRECTION

PATENT NO.   : 5,454,687
DATED        : October 3, 1995
INVENTOR(S)  : Peter E. Johnson, et al.

It is certified that error appears in the above-identified patent and that said Letters Patent is hereby corrected as shown below:

Column 6, Line 26    : delete "member"
                       insert --number--

Signed and Sealed this

Ninth Day of April, 1996

Attest:

BRUCE LEHMAN

*Attesting Officer*          *Commissioner of Patents and Trademarks*